INVENTOR.
GUIDO GIOMMI
ATTORNEYS

United States Patent Office 3,530,180
Patented Sept. 22, 1970

3,530,180
PROCESS FOR THE MANUFACTURE OF UREA
FROM AMMONIA AND CARBON DIOXIDE
Guido Giommi, Via Boni 2, Milan, Italy
Filed Mar. 7, 1967, Ser. No. 621,316
Claims priority, application Italy, Sept. 15, 1966,
22,445/66
Int. Cl. C07c 127/00
U.S. Cl. 260—555                                  2 Claims

ABSTRACT OF THE DISCLOSURE

A process for the manufacture of urea from ammonia and carbon dioxide is disclosed, the improvement consisting in condensing the split products withdrawn from the distillation zone so as to form liquid carbamate and separating said carbamate from excess ammonia, the carbamate being returned to the synthesis environment whereas ammonia is recirculated towards the distillation zone again: the subject process requires a lesser expenditure of raw materials and power and gives improved yields over the prior art methods.

---

The present invention relates to a process for the manufacture of urea from ammonia and carbon dioxide.

Many processes of this type are well known in the art. In these conventional processes, the conversion of ammonia and carbon dioxide into urea is achieved under high pressures and temperatures in such a way that ammonium carbamate is first manufactured from carbon dioxide and ammonia, said ammonium carbamate being then converted in a subsequent step into urea with separation of water. The reactions take the following courses:

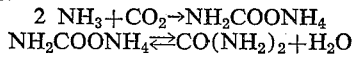

$$2\ NH_3 + CO_2 \rightarrow NH_2COONH_4$$
$$NH_2COONH_4 \rightleftharpoons CO(NH_2)_2 + H_2O$$

In the actual practice, this process is carried out by applying pressures of from 150 to 200 atmospheres and temperatures between 180° C. and 200° C. In such a process, however, the conversion of the carbamate into urea, that is the separation of water, is not achieved completely, but, at best, by approximately 70%. According to the opinion which is most widely accepted by those skilled in the art, the main task of urea manufacture is to separate and recover the unconverted ammonium carbamate which is still present in the reaction mixture. Several expedients have been adopted in order that this problem might be satisfactorily solved from an economical standpoint.

It is also known to split the carbamate into gaseous ammonia and carbon dioxide. If so, the working temperature is increased according to the working pressure. A frequently encountered drawback is that the urea contained in the reaction mixtures has a tendency, at high temperatures, towards being reconverted into ammonium carbamate and into the starting materials (ammonia and carbon dioxide) or also, for example, into biuret. By so doing, contamination of the end product is a result with the possible reduction of its commercial value. Consequently, the carbamate is generally decomposed under pressures which are considerably lower than the pressure obtaining during synthesis. For example, a conventional process is known, in which pressure is released stepwise from the reaction mixture, the decomposition of the carbamate being achieved through a number of stages, the pressure being eventually reduced to a value near the atmospheric pressure. If it is not practicable to use the decomposition products any further, i.e. ammonia and carbon dioxide, in the condition in which they were obtained upon decomposition, then they should be compressed again to the synthesis pressure in order that they may be used for the urea synthesis again.

This repeated compression, which may take place either in gaseous condition or after previous condensation of the gaseous components into liquids, requires a high power expenditure for the specially provided compressors. In addition, the strong corrosion brought about by the ammonia and carbon dioxide mixture is conducive to very high upkeep costs.

Attempts have already been made towards decomposing the carbamate under pressures and temperatures which were higher than those applied according to the methods used nowadays. In these tentative methods, the reaction mixture was distilled, while making sure that excess ammonia was always present in the mixture.

It is known, on the other hand, that the reverse reactions, to which urea is subjected at high temperatures, are hindered or delayed when an excess of free ammonia is present. It has been attemped to exploit this knowledge by using an equipment comprising a synthesis apparatus in which the formation of the carbamate and the dehydration of urea took place, and a distillation apparatus in which the decomposition of the carbamate was caused to occur at a pressure which was very much the same as the synthesis pressure. In this process, carbon dioxide was directly fed into the synthesis reactor, while ammonia was first caused to pass through the distillation apparatus so as to form the excess free-ammonia values which are necessary to hinder or to slow down urea decomposition and/or reconversion.

In this process, the ammonia values were introduced in gaseous and/or gasified condition and then they entered the synthesis apparatus together with the other gases formed during the decomposition process. However, the amount of additional free ammonia which can be fed into said distillation apparatus is limited, that is, it should not exceed the amount which is necessary for preparing urea, plus an amount of ammonia, either free or combined, which was drawn off from the distillation plant together with the urea and in solution. These facts occur because the installation is a closed-loop plant in which the fed-in ammonia should be balanced with the quantity of ammonia which is eventually set free.

By so doing, it was not possible to separate the carbamate from the other reaction components beyond a certain limit, because the increased temperature and the dwell time of the reaction mixture in the distillation plant caused a part of the urea to be reconverted and to form additional carbamate.

It is an object of the present invention to achieve a complete separation of the carbamate by a continuous process for the manufacture of urea from ammonia and carbon dioxide under high pressures and temperatures, in which the amount of unreacted ammonium carbamate is split by distillation of the reaction products under pressures which are in the range of values of the synthesis pressure and in the presence of an excess of ammonia, the split product being fed into the synthesis environment again and the urea being withdrawn from the distillation environment.

According to this invention, these results are achieved by withdrawing from the top of the distillation apparatus a mixture consisting of the decomposition products of carbamate and excess gaseous ammonia, condensing all of said gaseous products so as to obtain liquid carbamate, feeding said carbamate into the urea synthesis environment again, and recirculating thereafter into the distillation environment the gases, which now consist of almost pure ammonia. In the practice of the invention, it has been found expedient to condense the gases withdrawn from the distillation environment with the addition of small amounts of water, which are those just sufficient to prevent the precipitation of the condensed carbamate.

According to a further feature of this invention, the excess ammonia which is circulated, is fed into the distillation environment together with the entire ammonia charge or with a fraction thereof, whereas the entire carbon dioxide charge, or a fraction thereof, is added to the gases withdrawn from the distillation environment before the gases are condensed.

Moreover, it has been found convenient to compress the ammonia which is circulated, according to the invention, before feeding it into the distillation environment, in order to allow for pressure losses, or to separate the inert components from said circulated ammonia by subjecting it to condensation again before admitting it into the distillation environment.

According to still another feature of the present invention, the ammonia charge which is fed into the distillation area, and the carbon dioxide charge which is supplied to the gases withdrawn from said distillation area are both supercompressed and fed into the system by means of ejectors.

The practice of the inventive process further permits an almost complete separation of the excess ammonia from the gases formed during the decomposition of the carbamate, which are fed into the reactor, whereas the excess ammonia is recycled into the distillation plant.

Inasmuch as the pressure at which distillation takes place is, more or less, the synthesis pressure, carbamate can be obtained without being confronted with the necessity of feeding larger amounts of water into the reactor and without using machinery which should be specially designed to withstand the corrosive action of the liquid and gas mixtures.

The invention will be better understood from the ensuing detailed description of a few exemplary embodiments thereof which should not be construed as limitations, and are illustrated in the accompanying drawings, wherein.

Figure 1:
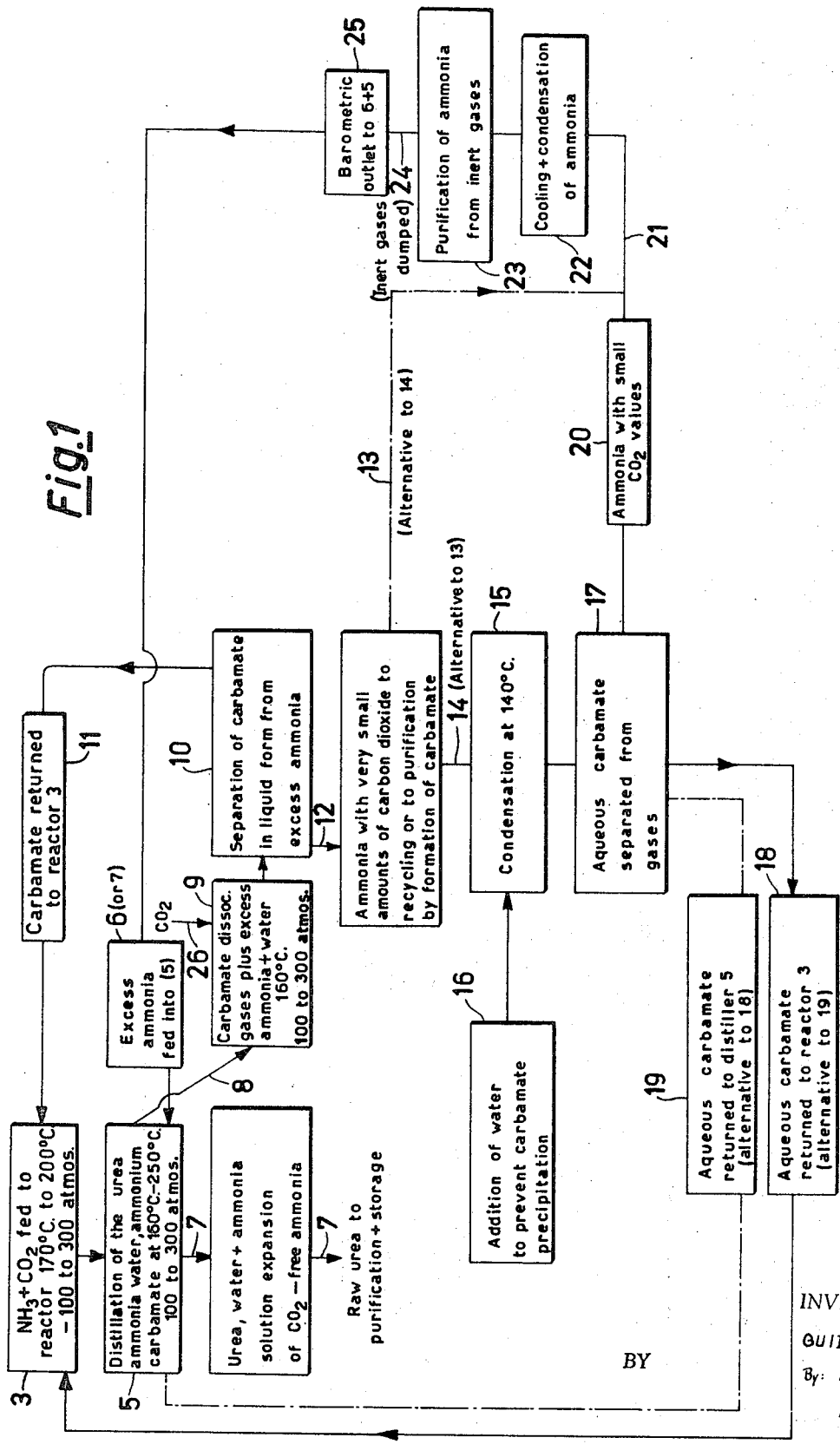
FIG. 1 is a flow-sheet which shows the several operational steps of an embodiment of the inventive process, an alternative thereto being indicated in dash-and-dot lines.

Having now initially reference to FIGS. 1 and 2 of the drawings, a first embodiment of the invention will be described, while outlining also a partial alternative thereto. As shown in the drawings, carbon dioxide is fed into a reactor 3 through a duct 1, ammonia being fed through the duct 2. Within the reactor a pressure of from 100 to 300 atmospheres obtains at a temperature lying in the range from 170° C. to 200° C. From the reactor 3, the reaction mixture is continually fed, via a pipeline 4, into a distillation apparatus 5, said mixture consisting of urea, ammonium carbamate, water and ammonia. Within said distillation apparatus, there is a temperature between 160° C. and 250° C., the pressure being, more or less, the one obtaining within the reactor 3. Excess ammonia, intended to delay and counteract the undesirable urea reconversion reaction, is now fed into the bottom portion of said distillation apparatus via the duct 6. Said ammonia is above the transition point between gaseous and liquid ammonia, that is, it is still in the gaseous condition and is thus enabled to rise with the other carbamate-decomposition gases, coming thereby into constant contact with said reaction mixture.

A urea, water and ammonia solution is continually dumped via the duct 7. Upon expansion and withdrawal of $CO_2$-free ammonia, the solution is sent to further treatment so as to obtain urea as the end product.

The gaseous substances originated from the decomposition of the carbamate are dumped from the top portion of the distillation plant through a duct 8, together with the excess ammonia and a small amount of water, to be fed subsequently into a condenser 9. Within the condenser 9, the gases have their temperature reduced to a value which lies between the solidification temperature of the carbamate and approximately 160° C. In this way, almost complete condensation of the carbamate takes place, said carbamate having already been decomposed within the distillation apparatus 5 and being now in such a condition as to be separated in liquid form from the gaseous ammonia in separator 10, the latter being under the same pressure as reactor 3, the due allowance being made for pressure losses throughout the pipelines. Said separator 10 is situated at a higher level than that of the reactor 3, so that the carbamate can flow into the reactor by means of a barometric outlet or discharge 11.

The gases dumped from separator 10 via a pipeline 12 consist of virtually pure ammonia and contain, consistently with the operating conditions, up to 50 parts of $CO_2$ per 1,000 parts of gas. Said gases could be passed on through a valved conduit 13 directly to a pipeline 21, or, as an alternative, if a further separation of $CO_2$ in the carbamate form is desired, through a valved conduit 14 onto a condenser 15 where their temperature is caused to drop to 140° C. approximately.

The small amount of carbamate which could still be formed there, would be solid at that temperature. Thus, small water values, sufficient to prevent the precipitation of the condensed carbamate, are fed into the condenser 15 through a pipeline 16, so that the carbamate is kept in liquid form. These small additional amounts of water cannot be specified a priori for all the practical cases, but can be determined empirically according to the particular operational conditions of the installation. The step of feeding-in such small amounts of water is critical, rather than the numerical values thereof. The aqueous solution is separated in a separator 17 from the gas, and flows on, also due to the action of its own weight, through said barometric outlet or discharge 18 to the reactor 3, or, via pipeline 19, to the distillation apparatus 5.

The ammonia which is discharged via a pipeline 20, from the separator 17 now contains only from 0.5 to 5.0 parts of $CO_2$ per 1,000 parts of gas. The virtually chemically pure ammonia flows through a pipeline 21 to another condenser 22 in which it is cooled down below its critical temperature and is then condensed. In another separator 23, the liquid ammonia is then separated from the inert components which leave the plant via a pipeline 24, and is returned by gravity through the barometric outlet 5 and pipeline 6 back to the distillation apparatus 5, the latter being arranged at a level which is slightly below separator 23.

If it is desired to increase the amount of ammonia which is fed into the distillation apparatus 5, the whole ammonia charge, or a portion thereof, can be admitted into said apparatus through a pipeline 27 instead of pipeline 2. In such a case, it is necessary to feed the entire carbon dioxide charge, or a portion thereof, through the pipeline 26 rather than through the pipeline 1. The carbamate intended for the conversion into urea will then be formed not in reactor 3, but rather, either completely or in part, in condenser 9, together with recycled carbamate, and will flow together with the latter through the barometric discharge 11 into the reactor 3.

The excess ammonia, which has been separated from the $CO_2$, and which flows through the pipeline 21, can be returned to the distillation apparatus even without previous condensation. If this is intended, the gas is passed through a device 22b which is arranged for the purpose of making up for the pressure losses which occur in the pipelines as well as inside the apparatus. Any corrosion is excluded, since the compressor is fed with almost completely pure ammonia.

In order to achieve a compensation for pressure losses, it is also possible to supercompress the gas charges, and to admit the same in gaseous condition by means of injectors.

Figure 2:
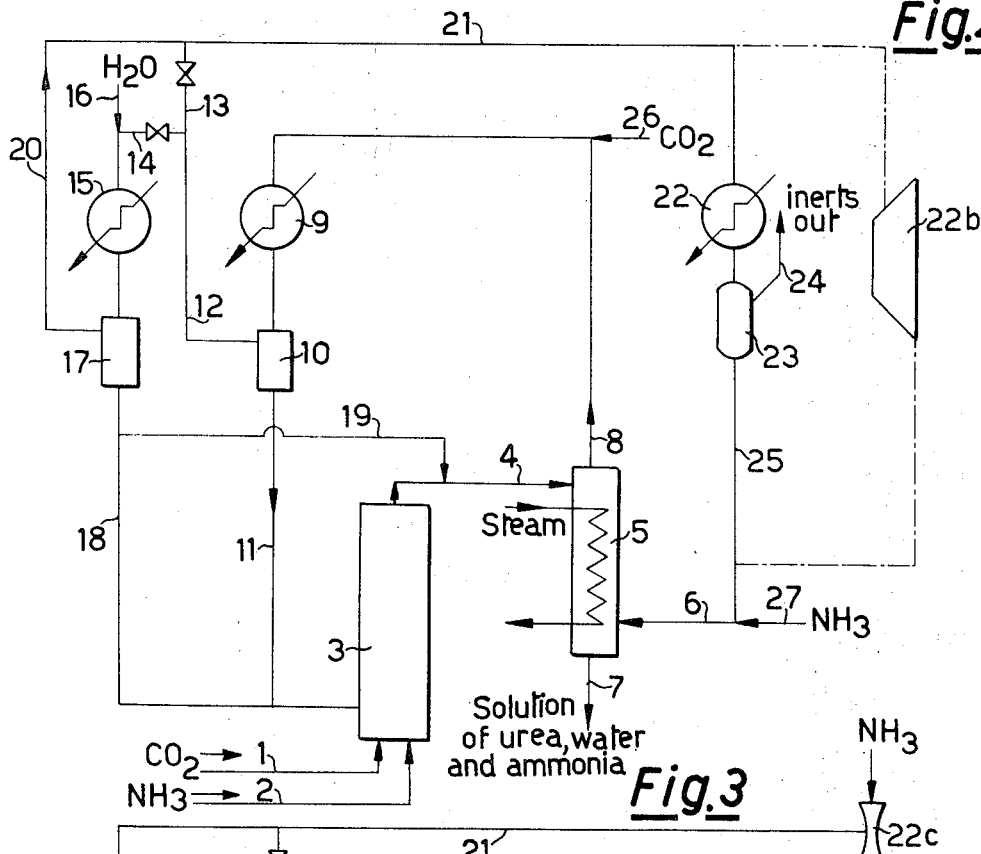
FIG. 2 is a diagram showing the arrangement of the apparatus for performing the process outlined in the flow-sheet of FIG. 1 and the alternative method thereof.

An alternative embodiment of the process described in detail in the foregoing can still be seen in FIGS. 1 and 2, and has been indicated in dash-and-dot lines in both these figures. On considering more particularly the portion shown in dash-and-dot lines on the right, as viewed on FIG. 2, all the operations are carried out as described above, the only exception being that excess ammonia flowing through the pipeline 21 is directly recycled towards the distillation apparatus 5 without being condensed: this recycling step is carried out by a compressor 22b, shown just in the right portion of FIG. 2. The main task of said compressor is to compensate for the pressure losses undergone by the gases when they are caused to pass through the several pipelines and apparatus. Thus, a large compressor is not at all necessary and the power expenditure is reduced: in addition, said compressor operates on pure ammonia only, any corrosion hazard being thus surely prevented.

Figure 3:
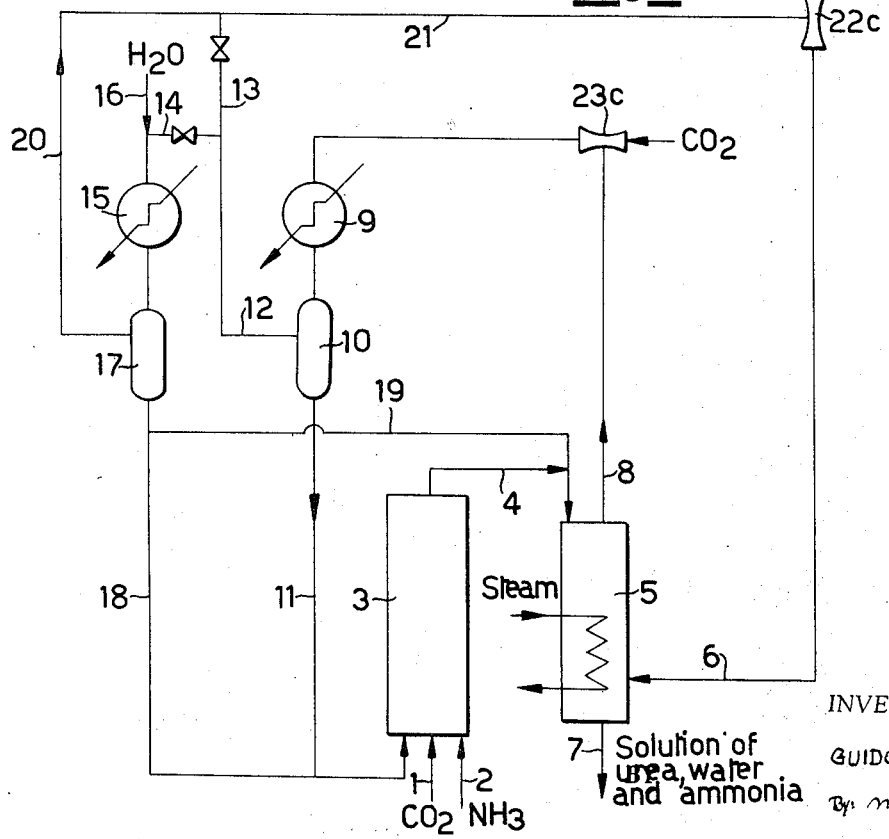
FIG. 3 is a diagram showing a modification of the method shown in FIGS. 1 and 2.

The embodiment shown in FIG. 3 corresponds, in the main, to the diagram of FIGS. 1 and 2, and like parts have been indicated by like numerals and thus a detailed description will not be given to avoid unnecessary repetitions. In the embodiment shown in FIG. 3, the feeding ammonia, instead of being directly admitted into the plant through the duct 2 (or through the duct 27) is supercompressed entirely or in part and is fed in gaseous condition through the ejector 22c, the possible remaining part of the ammonia being introduced through the duct 2. On the other hand, carbon dioxide, instead of being fed into the installation through the conduit 1 (or through the conduit 26), is supercompressed, entirely or in part, and fed in gaseous condition through the ejector 23c, a possible $CO_2$ balance being introduced through the conduit 1.

The ejectors 22c and 23c fulfill the function of compensating for the pressure losses, the circulation of the gases through the several conduits and apparatus being thus maintained. The excess ammonia can now be recycled through the conduit 6 towards the distiller 5.

While the invention has been shown and described in connection with a few preferred embodiments thereof, it should be understood by those skilled in the art that many modifications and changes may be introduced therein without departing from the spirit and scope of the invention.

What is claimed is:

1. In a continuous process for the synthesis of urea from ammonia and carbon dioxide under high pressure and at elevated temperatures, wherein the portion of ammonium carbamate which is not converted into urea is split into its components by distillation at pressures and temperatures approximately equal to synthesis pressures and temperatures, in the presence of an excess quantity of ammonia, with the split products being readmitted to the urea synthesis and the urea being drawn off from the distillation zone, the improvement which comprises condensing the split products withdrawn from said distillation zone so as to form liquid carbamate and separating said carbamate from said excess ammonia, returning said carbamate into the urea synthesis, recirculating and admitting said ammonia into the distillation zone and adding at least a portion of the carbon dioxide charged into the synthesis to the gases withdrawn from the distillation zone before their condensation.

2. The process according to claim 1, wherein an ammonia charge, is compressed and then admitted to the distillation zone by injection and the carbon dioxide charge, which is added to the gases which have been withdrawn from said distillation zone, is compressed and then added to said gases by injection.

References Cited

UNITED STATES PATENTS

| | | | |
|---|---|---|---|
| 3,114,681 | 12/1963 | Biekart et al. | 260—555 |
| 3,146,263 | 8/1964 | Otsuka | 260—555 |

FOREIGN PATENTS

| | | |
|---|---|---|
| 1,031,528 | 6/1966 | Great Britain. |

BERNARD HELFIN, Primary Examiner

M. W. GLYNN, Assistant Examiner